(12) United States Patent
de Jong

(10) Patent No.: US 6,912,633 B2
(45) Date of Patent: Jun. 28, 2005

(54) ENHANCED MEMORY MANAGEMENT FOR PORTABLE DEVICES

(75) Inventor: Eduard de Jong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 522 days.

(21) Appl. No.: 10/101,290

(22) Filed: Mar. 18, 2002

(65) Prior Publication Data

US 2003/0177319 A1 Sep. 18, 2003

(51) Int. Cl.$^7$ ............................................. G06F 12/14
(52) U.S. Cl. ........................ 711/163; 711/156; 711/115
(58) Field of Search ................................ 711/163, 156, 711/115

(56) References Cited

U.S. PATENT DOCUMENTS

| | | | |
|---|---|---|---|
| 4,734,568 A | 3/1988 | Watanabe | |
| 5,384,749 A | 1/1995 | Lisart et al. | |
| 5,802,519 A | 9/1998 | De Jong | 707/100 |
| 5,836,014 A | 11/1998 | Faiman, Jr. | |
| 5,887,161 A | 3/1999 | Cheong et al. | |
| 5,894,550 A | 4/1999 | Thiriet | 395/185 |
| 5,930,363 A | 7/1999 | Stanford et al. | 380/24 |
| 6,005,942 A | 12/1999 | Chan et al. | 380/25 |
| 6,038,397 A | 3/2000 | Iwanishi et al. | |
| 6,052,690 A | 4/2000 | de Jong | 707/101 |
| 6,094,656 A | 7/2000 | De Jong | 707/100 |
| 6,220,510 B1 | 4/2001 | Everett et al. | 235/379 |
| 6,282,700 B1 | 8/2001 | Grover et al. | |
| 6,292,874 B1 | 9/2001 | Barnett | |
| 6,349,344 B1 | 2/2002 | Sauntry et al. | |
| 6,463,581 B1 | 10/2002 | Bacon et al. | |
| 6,526,571 B1 | 2/2003 | Aizikowitz et al. | |

FOREIGN PATENT DOCUMENTS

| | | |
|---|---|---|
| EP | 0 605 872 A1 | 7/1994 |
| EP | 0 751 458 A1 | 1/1997 |
| EP | 0 821 305 A2 | 1/1998 |
| FR | 2 806 813 | 3/2000 |
| WO | 94/24673 | 10/1994 |
| WO | 98/19237 | 5/1998 |
| WO | 99/16030 | 4/1999 |
| WO | 99/24944 | 5/1999 |

OTHER PUBLICATIONS

Back, G. et al., "Java Operating Systems", Design and Implementation, Technical Report UUCS–98–015, Online!, Aug. 6, 1998, Dept. of Computer Science, Univ. of Utah, US (located at http://www,cs–tr.cornell.edu:80/Dienst/UI/1.0/Display/ncstrl.utahcs/UUCS098–015.

Dreifus, H., "Smart Cards; A Guide to Building and Managing Smart Card Applications; Copyright 1998; Publisher Robert Ipsen' Smart Card Development Skills, Methods, and Tools"; pp. 159–176; 224–225.

Heiss, J. et al., "Java Card™ Technology Grows Up Smart", printed on Apr. 22, 2000 at http://java.sum.com/features/1990/01/javacard.html, 5 pages.

(Continued)

Primary Examiner—Reginald G. Bragdon
(74) Attorney, Agent, or Firm—Gunnison, McKay & Hodgson, L.L.P.

(57) ABSTRACT

A method for portable device memory management includes determining an operational mode of a program configured to execute on the portable device based on validating the presence of one or more memory markers in the memory. The one or more memory marker includes a memory line having a predetermined length and including a data portion and a tag. The method also includes allowing one or more commands based on the operational mode and terminating execution of the program if at least one but less than a predetermined number of memory markers are validly present in the memory.

79 Claims, 13 Drawing Sheets

OTHER PUBLICATIONS

Thomas David, J., "Smart and Smarter: The Emergence of Java Card™ Technology", printed on Apr. 22, 2000 from http://java/sun.com/features/1998/04/javacard.html, pp 1–8.

Sun Microsystems, Inc., "Java TM Card TM Runtime Environment (JCRE) 2.1 Specification–Draft 2", printed Dec. 4, 1998.

Sun Microsystems, Inc., "Smart Cards: A primer", printed on Apr. 22, 2000 from http://www.javaworld.com/javaworld/jw–12–19 b97/f jw–12–javadev_p.html, pp 1–13.

Sun Microsystems, Inc., "Java Card™ 2.1 Runtime Environment (JCRE) Specification", Jun. 7, 1999, Final Revision 1.1.

Sun Microsystems, Inc., "The K Virtual Machine (KVM)", White Paper Jun. 8, 1999, pp i–iv; 1–17.

Chan, "Infrastructure of Multi–Application Smart Card", http://home.hkstar.com/~alanchan/papers/multiApplication-SmartCard/, Jul. 25, 2002.

Chen, Zhiqun, "Java Card™ Technology for Smart Cards", *Sun Microsystems*, pp. 11–16, Jun., 2000.

Philips Semiconductor, "Designers offered first 16–bit smart card IC architecture with development tools", Press Release, Jul. 25, 2002.

Ritchey, Tim, "Advanced Topics: The Java Virtual Machine", *Java!*, Chapter 14, pp. 325–346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Delivers On Vision to Bring JAVA Technology to the Consumer and Embedded Market", Business Wire, Sep. 28, 1999.

"Sun Microsystems Announces JAVACARD API", Business Wire, Oct. 1996.

Sun Microsystems: "Sun's JAVA Technology Leads Open Worldwide Market for Smart Cards", M2, Presswire, May 1999.

Dean, Jeffrey, "ProfileMe: Hardware Support for Instruction–Level Profiling on Out–of–Order Processors", *IEEE* 1997; pp 292–302.

Dolby, Julian, "Automatic Inline Allocation of Objects", Concurrent Systems Architecture Group, Department of Computer Science, University of Illinois; 1997; pp 1–11.

Zhao, Jianjun "Applying Program Dependence Analysis to Java Software" Fukuoka Kogyo Daigaku Kenkyu Ronshu (Research Bulletin of Fukuoka Institute of Technology), vol. 31, No. 1, pp. 1–8 1998.

"*Memory Corruption Debugging System*", IBM Technical Disclosure Bulletin, IBM Corp., N.Y., Jan. 1, 1995, XP000498811, vol. 38, No. 1, pp. 395–400.

"*Pseudo–Dynamic Algorithm for Computer Memory Allocation*", IBM Technical Discloure Bulletin, IBM Corp., N.Y., Sep. 1, 1993, vol. 36, No. 9A, XP000396177, pp. 597–599.

A. Johan Cockx, "*Whole Program Comilation for Embedded Software: The ADSL Experiment*", Apr. 25–27, 2001, pp. 214–218.

International Search Report, PCT/FR 03/08508, International filing date Mar. 17, 2003.

International Search Report, PCT/FR 03/08506, International filing date Mar. 17, 2003, Search Report mailed Mar. 17, 2004.

ENHANCED MEMORY MANAGEMENT FOR PORTABLE DEVICES

FIELD OF THE INVENTION

The present invention relates to the field of computer science. More particularly, the present invention relates to a method and apparatus for enhanced memory management for portable devices.

BACKGROUND OF THE INVENTION

The use of small portable devices such as a smart card is becoming more prevalent. A smart card is a credit-card sized plastic card with an embedded computer chip. The smart card can be either a memory card or a microprocessor card. Memory cards simply store data and can be viewed as a small floppy disk with optional security. A microprocessor card, on the other hand, can use programs on the card to add, delete and manipulate information in card memory. For the remainder of this disclosure, "smart card" shall refer to a microprocessor card.

Smart cards typically include three types of memory: persistent nonmutable memory, persistent mutable memory and nonpersistent mutable memory. ROM (read-only memory) is the most widely used persistent nonmutable memory. EEPROM (electrical erasable programmable read-only memory) is the most widely used persistent mutable memory and RAM (random access memory) is the most widely used nonpersistent mutable memory.

FIG. 1 is a block diagram that illustrates a typical mechanism for memory management of a portable device. Device 100 includes a CPU (central processing unit) 105, RAM 110, ROM 115 and EEPROM 120. ROM 115 is typically used for storing fixed program units and the executive or kernel of the card 100. No power is needed to hold data in this kind of memory. However, it cannot be written to after the card 100 is manufactured. ROM 115 includes operating system routines 125 as well as permanent data 135 and user applications 130. The process of writing a binary image (representing programs and data) into ROM is called masking. It occurs during the chip fabrication process.

EEPROM 120, like ROM 115, can preserve data content when power to the memory is turned off. However, EEPROM 120 can be modified during normal use of the card 100. EEPROM 120 is therefore used for data storage. EEPROM 120 is the smart card's equivalent of a hard disk on a PC (personal computer). User applications can also be written into EEPROM 120 after the card 100 is made. EEPROM can be written to a limited number of times and has a limited data retention period. Additionally, reading from EEPROM 120 is as fast as reading from RAM 110, but writing to EEPROM 120 is typically several orders of magnitude slower than writing to RAM 110.

EEPROM 120 on a smart card 100 is typically separated into multiple partitions. As shown in FIG. 1, EEPROM 120 is separated into partitions for ROM patches (140), user application code (145) and user application data (150). The ROM patches partition 140 is used to store changes to the ROM 115 made after the masking. Read and write access to the various EEPROM partitions (140, 145, 150) may be controlled via a memory manager (not shown in FIG. 1) typically configured with one or more hardware fuses. The memory manager comprises hardware logic with configuration parameters that determine a smart card operational mode, EEPROM 120 partitioning information and EEPROM 120 read and write access control information for program code executing in a particular operational mode.

RAM 110 is typically used as temporary working space for storing and modifying data. RAM 110 is nonpersistent memory; that is, the information content is not preserved when power is removed from the array of memory cells. RAM 110 can be accessed an unlimited number of times and none of the restrictions found with EEPROM 120 apply.

ROM 115 is the least expensive of the three kinds of memory. EEPROM 120 is more expensive than ROM 115 because an EEPROM 120 cell takes up four times as much space as a ROM 115 cell. RAM 110 is very scarce in a smart card chip 100. A RAM 110 cell of the kind typically used in smart cards tends to be approximately four times larger than an EEPROM 120 cell.

Smart cards 100 typically have a test mode that is used for verifying the chips during the fabrication process, and for executing internal test programs while the semiconductors are still in the wafer or after they have been packaged in modules by the manufacturer. The test mode allows types of access to the memory that would violate security requirements and therefore are strictly forbidden when the chips are later in actual use. For technical reasons, however, it is an unavoidable requirement to be able to read data from the EEPROM 120 in this mode.

To obtain a high level of security, the change from the test mode to the user mode should be irreversible. This can, for instance, be realized by using a polysilicon fuse on the chip. In this case, a voltage is applied to a test point on the chip that is provided for this purpose, and this voltage causes the fuse to melt through. The chip is thus switched into the user mode using hardware. Normally, this cannot be reversed. However, a fuse is by its nature a relatively large structure on the surface of the chip. A fuse may be mechanically bridged after a passivation layer covering the chip has been partially removed where it covers the fuse. This puts the smart card 100 back into test mode, allowing the memory to be read out using the extended access options available in test mode. If a sufficient amount of the memory content is known, it is relatively easy to clone the smart card that has been read out. Other hardware fuse technology has been used to reduce the risk of physical defeat.

A microprobe attack is a method used to extract information from a smart card 100. One such attack taps the busses between the CPU 105 and the memories (ROM 115, EEPROM 120 and RAM 110) of the smart card microcontroller. Before this can occur, the chip must be exposed and the passivation layer on the top surface of the chip must be removed. The passivation layer protects the chip against oxidation on the one hand, but it also protects the chip against attack, since sensors monitor its integrity. However, attacks are known that may defeat such countermeasures.

After the passivation layer has been removed from the entire surface of the chip, or only from selected locations, it would be at least theoretically possible to make contact with the address, data and control busses for the memory using microprobe needles. If electrical connections to all the lines of these three busses are made, it is relatively easy to address the individual memory cells and to read any desired regions of the ROM 115 and EEPROM 120. The chip does not have to be powered for this, and any desired type of connection jig can be used. The potential consequences of a successful attack using this method are serious, since it could make secret data in the non-volatile memory readable. This method could be extended by making connections to the busses and then operating the chip in a normal manner. In this way, it would be possible to eavesdrop on the complete data traffic between the CPU 105 and the memories (110, 115, 120), and this could be recorded using a sufficiently fast logic analyzer. Other microprobing attacks are possible.

Unfortunately, the ability to circumvent hardware fuse-based memory protection decreases card security. Accordingly, what is needed is a solution that provides a relatively secure partitioning of a smart card memory. A further need exists for such a solution that is relatively flexible.

SUMMARY OF THE INVENTION

A method for portable device memory management includes determining an operational mode of a program configured to execute on the portable device based on validating the presence of one or more memory markers in the memory. The one or more memory marker includes a memory line having a predetermined length and including a data portion and a tag. The method also includes allowing one or more commands based on the operational mode and terminating execution of the program if at least one but less than a predetermined number of memory markers are validly present in the memory.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
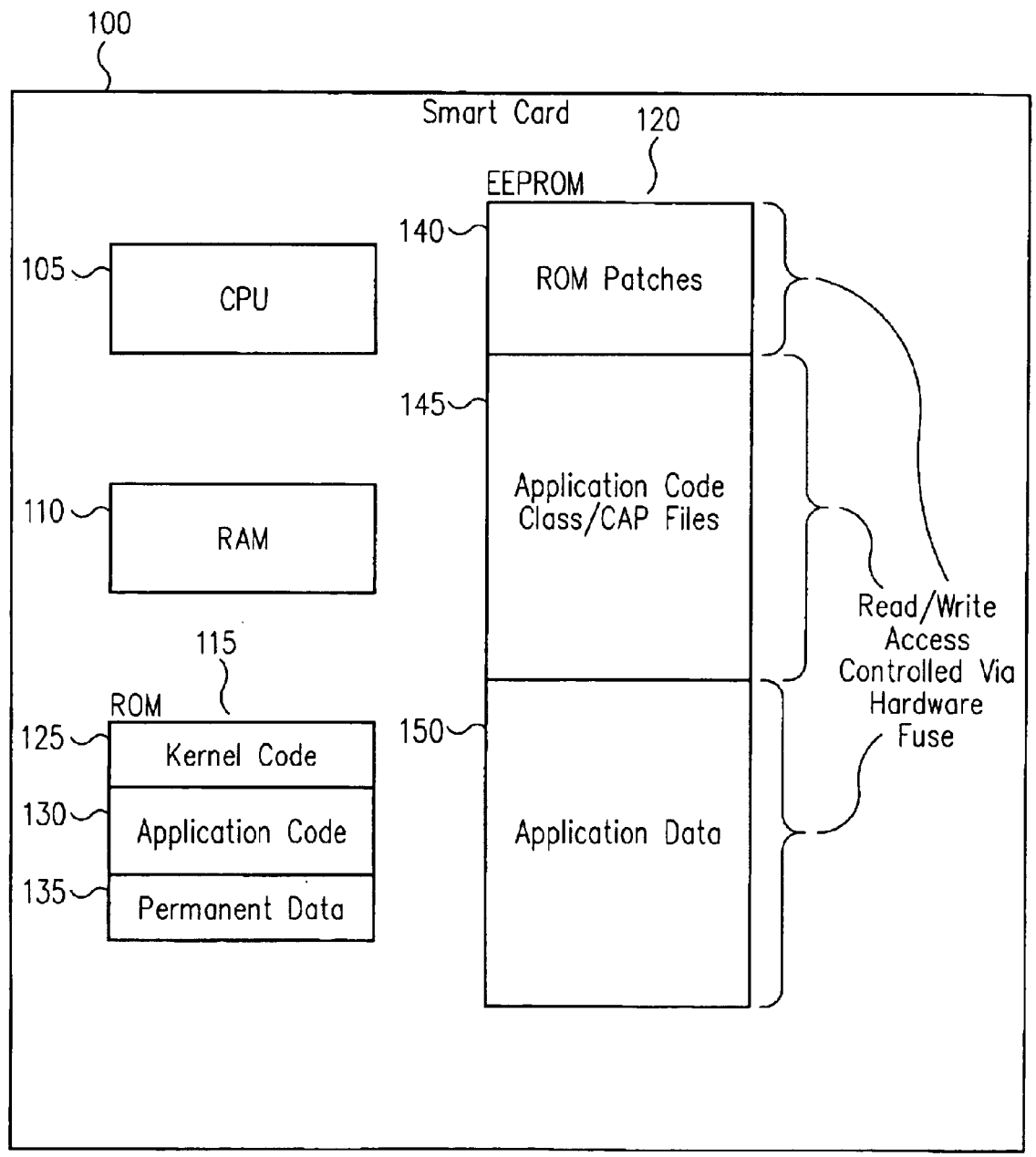
FIG. 1 is a block diagram that illustrates a typical mechanism for memory management of a portable device.

Embodiments of the present invention are described herein in the context of a method and apparatus for enhanced memory management for portable devices. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Palo Alto, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

According to embodiments of the present invention, a device memory is partitioned using one or more memory markers stored in the memory. The state of the memory markers in the memory determines an operational mode of a program executing on the device. It also determines memory access privileges of the program.

Figure 2:
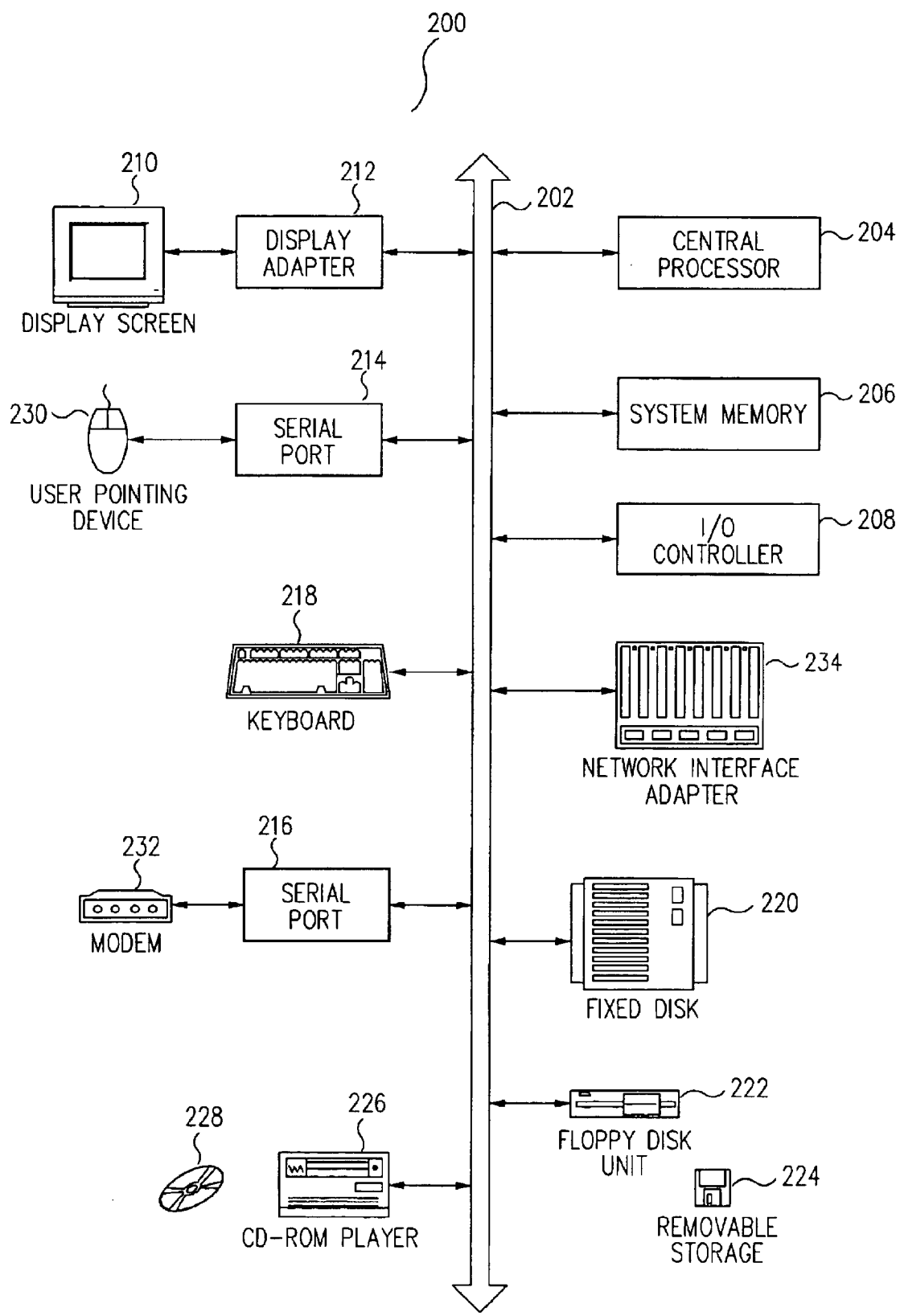
FIG. 2 is a block diagram of a computer system suitable for implementing aspects of the present invention.

FIG. 2 depicts a block diagram of a computer system 200 suitable for implementing aspects of the present invention. As shown in FIG. 2, computer system 200 includes a bus 202 which interconnects major subsystems such as a central processor 204, a system memory 206 (typically RAM), an input/output (I/O) controller 208, an external device such as a display screen 210 via display adapter 212, serial ports 214 and 216, a keyboard 218, a fixed disk drive 220, a floppy disk drive 222 operative to receive a floppy disk 224, and a CD-ROM player 226 operative to receive a CD-ROM 228. Many other devices can be connected, such as a pointing device 230 (e.g., a mouse) connected via serial port 214 and a modem 232 connected via serial port 216. Modem 232 may provide a direct connection to a remote server via a telephone link or to the Internet via a POP (point of presence). Alternatively, a network interface adapter 234 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 206 or stored on storage media such as fixed disk 220, floppy disk 224 or CD-ROM 228.

Figure 3:
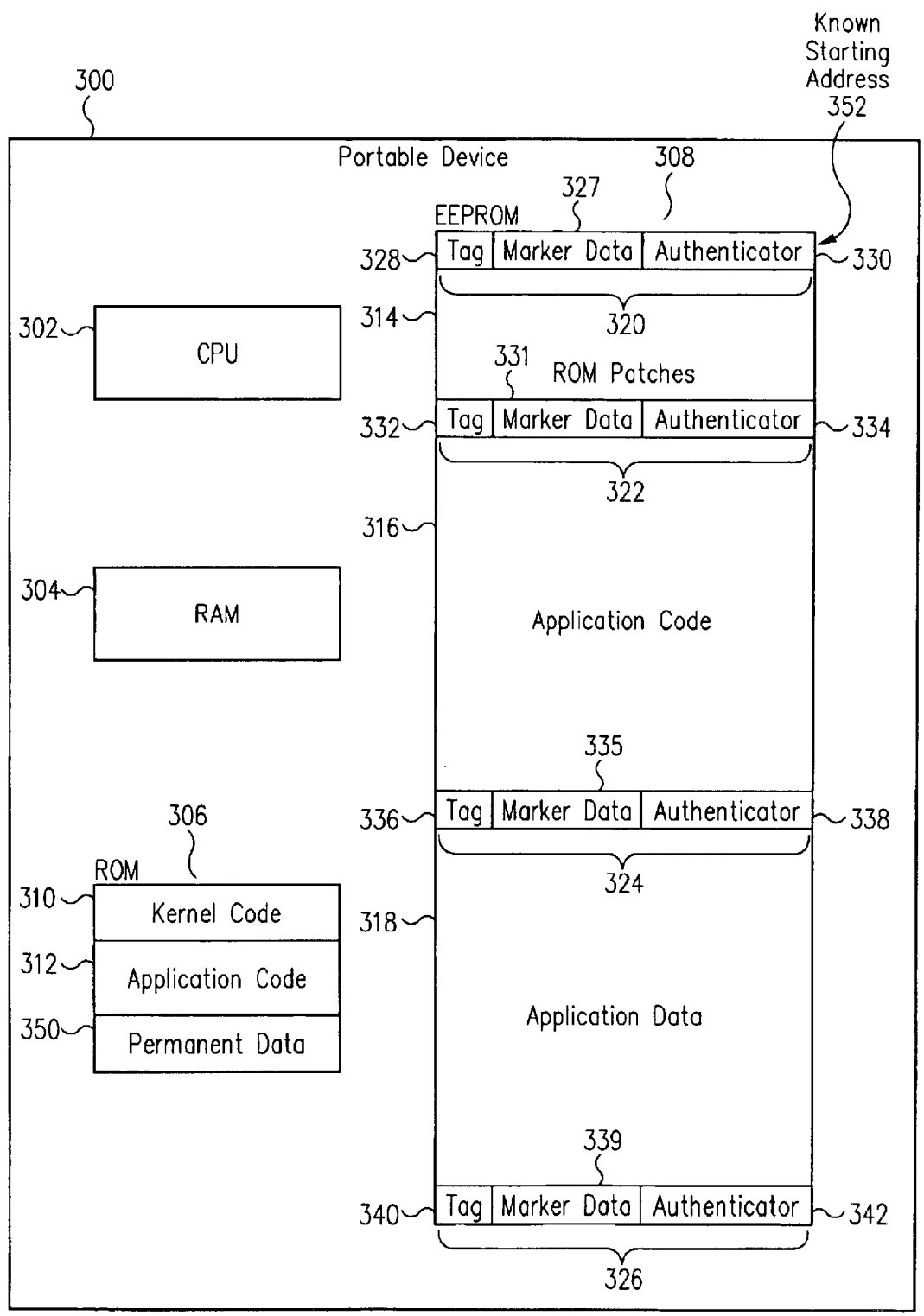
FIG. 3 is a block diagram that illustrates an apparatus for portable device memory management using memory markers having separate tag and authenticator fields in accordance with one embodiment of the present invention.
Figure 5:
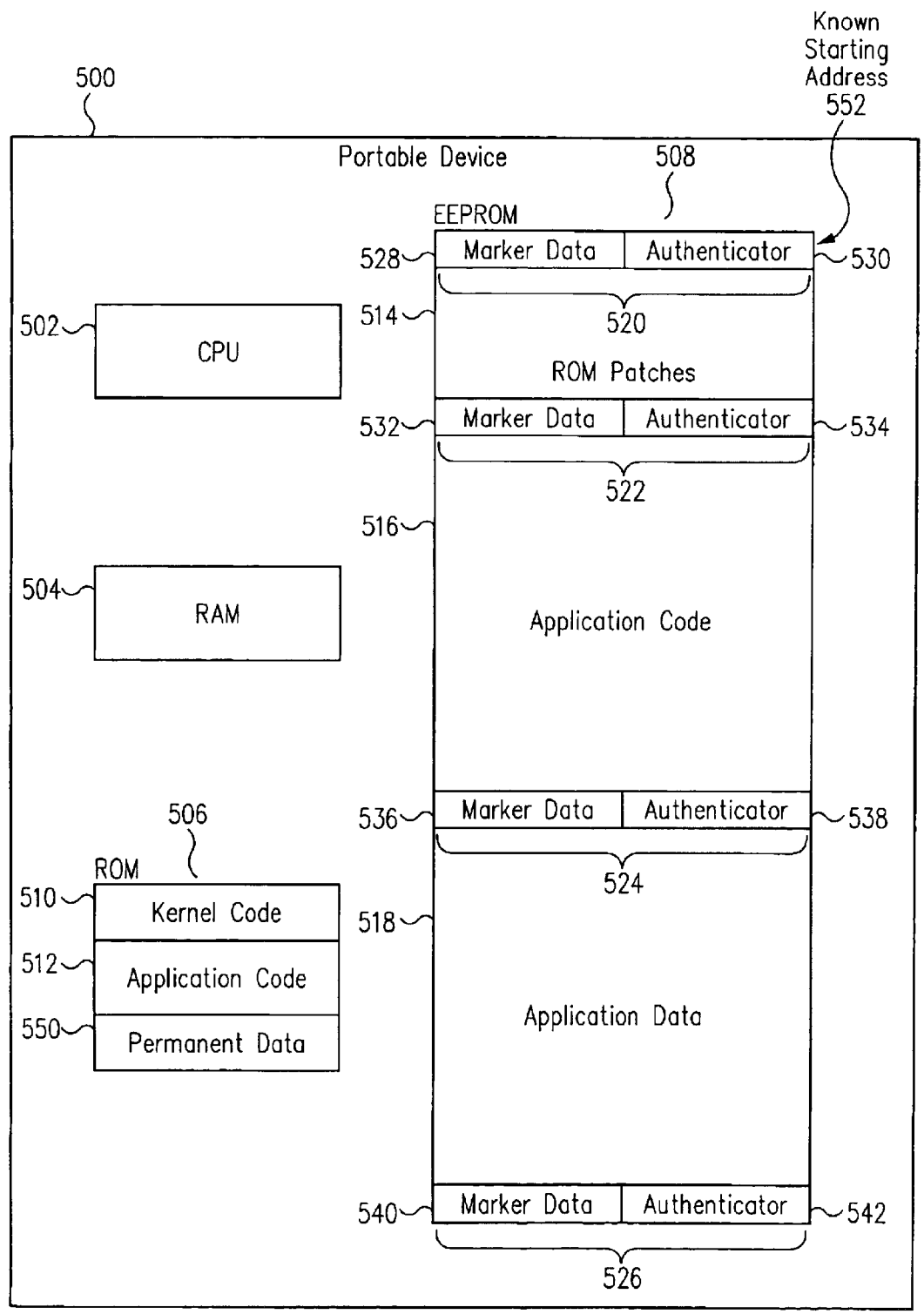
FIG. 5 is a block diagram that illustrates an apparatus for portable device memory management using memory markers having an authenticator field that also serves as a tag field in accordance with one embodiment of the present invention.
Figure 6:
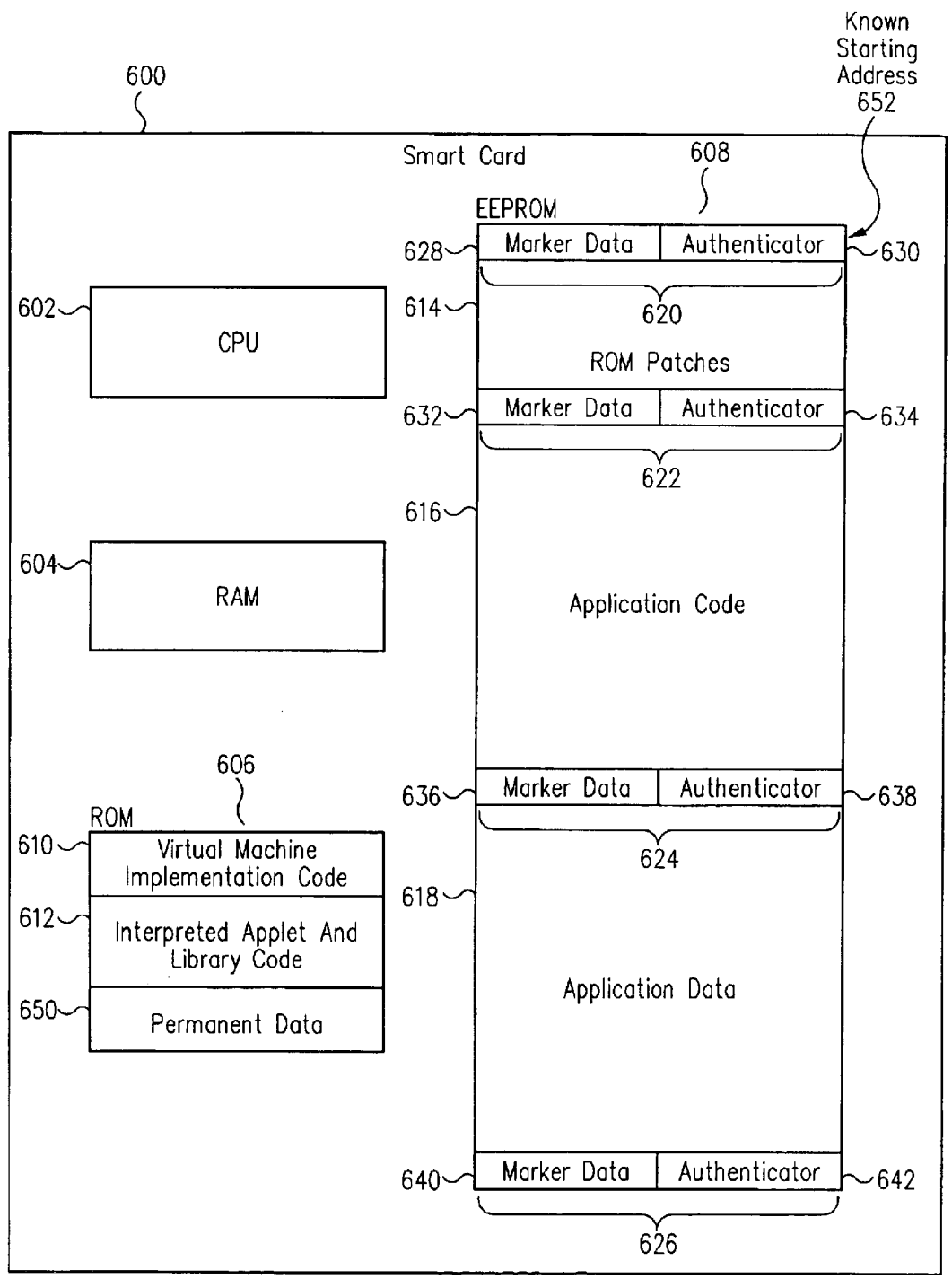
FIG. 6 is a block diagram that illustrates an apparatus for smart card memory management using memory markers having an authenticator field that also serves as a tag field in accordance with one embodiment of the present invention.

FIGS. 3, 5 and 6 illustrate apparatus for device memory management using memory markers in accordance with embodiments of the present invention. FIG. 3 illustrates using memory markers having separate authenticator and tag fields. FIG. 5 illustrates using an authenticator field that also serves as a tag field. FIG. 6 illustrates memory management for a smart card.

Turning now to FIG. 3, a block diagram that illustrates an apparatus for portable device memory management using memory markers having separate tag and authenticator fields in accordance with one embodiment of the present invention is presented. Device 300 includes a CPU 302, RAM 304, ROM 306 and EEPROM 308. ROM 306 stores operating system code 310, application code 312 and permanent data 350. EEPROM 308 is separated into partitions for storing ROM patches 314, user application code 316 and user application data 318. Memory markers 320, 322, 324, and 326 define the partition boundaries. Thus, ROM patches partition 314 is defined by memory markers 320 and 322, application code partition 316 is defined by memory markers 322 and 324 and application data partition 318 is defined by memory markers 324 and 326. Each of memory markers (320, 322, 324, and 326) comprises a line of memory and a line of memory comprises a predetermined number of memory units. This predetermined number may be determined based on hardware-dependent EEPROM properties such as the maximum size of an atomic write operation.

Still referring to FIG. 3, each of memory markers (320, 322, 324 and 326) is divided into a tag (328, 332, 336, 340), a data portion (327, 331, 335, and 339) and an authenticator (330, 334, 338, 342). The tag (328, 332, 336, 340) identifies a memory line as a memory marker (320, 322, 324 and 326). The data portion (327, 331, 335, and 339) includes information about the memory marker (320, 322, 324 and 326), such as a partition ID and an indication of whether the memory marker (320, 322, 324 and 326) marks the start or end of the partition (314, 316, 318). The authenticator (330, 334, 338, 342) is computed over at least part of the corresponding data portion (327, 331, 335, and 339) and tag (328, 332, 336, 340), thus making each memory marker (320, 322, 324 and 326) internally redundant.

According to one embodiment of the present invention, the authenticator (330, 334, 338, 342) comprises a checksum. According to another embodiment of the present invention, the authenticator (330, 334, 338, 342) comprises a CRC (cyclic redundancy code). Those of ordinary skill in the art will recognize that other authenticators are possible.

In operation, examination of memory partitions begins with known starting address 352. The known starting address may be computed using information that is unique to each card, such as a card serial number. When a memory marker is located, a memory configuration table is updated to include partition information including a partition ID, the memory marker address and an indication of whether the memory marker address corresponds with the start of the partition or the end of the partition.

Those of ordinary skill in the art will recognize that other partitioning schemes are possible. By way of example, EEPROM 308 may include a larger number of partitions. EEPROM 308 may also include a smaller number of partitions. Additionally, the number of operational modes may be different.

According to one embodiment of the present invention, device 300 is coupled to one or more hardware fuses (not shown in FIG. 3), making operation of the device 300 based at least in part on the state of the one or more hardware fuses. The one or more hardware fuses may be used to supplement, replace, enable or disable one or more aspects of the memory management methods described herein. By way of example, device 300 may be configured such that a fuse setting determines whether memory management is performed by a hardware-based memory management unit or whether memory management is performed based on the presence of one or more memory markers in a memory.

Figure 4A:
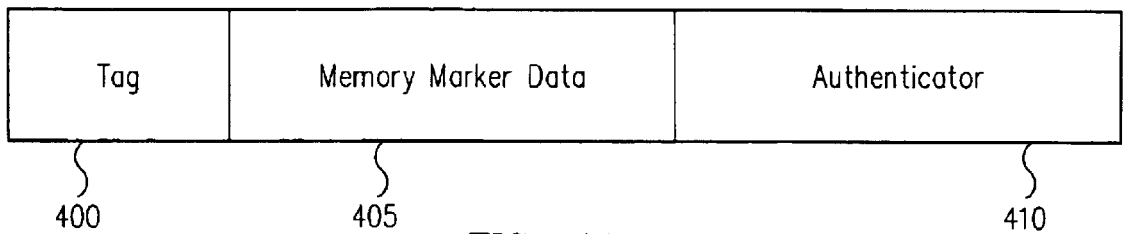
FIG. 4A is a block diagram that illustrates a memory marker having separate tag and authenticator fields in accordance with one embodiment of the present invention.
Figure 4B:
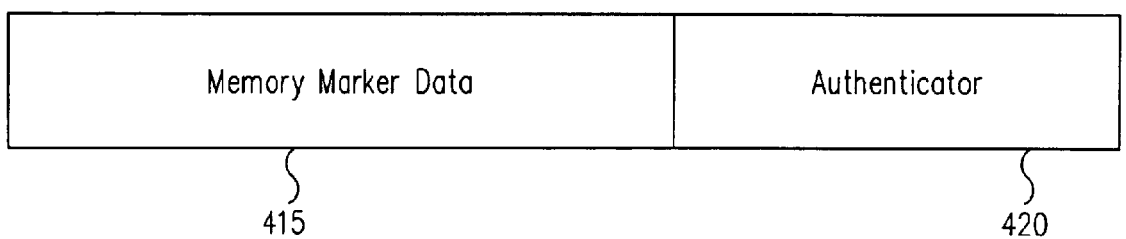
FIG. 4B is a block diagram that illustrates a memory marker having an authenticator field that also serves as a tag field in accordance with one embodiment of the present invention.
Figure 4C:
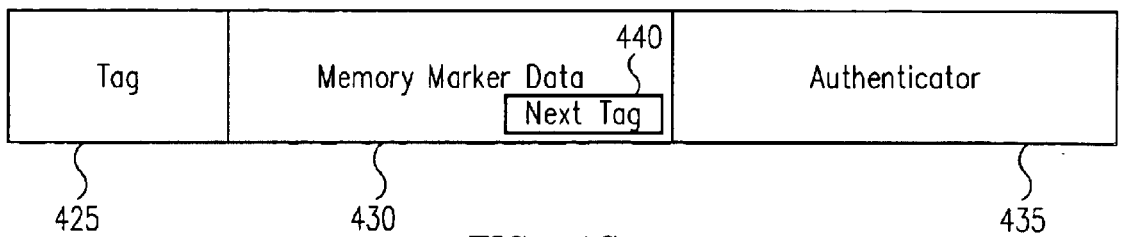
FIG. 4C is a block diagram that illustrates a memory marker having separate tag and authenticator fields and a reference to a succeeding memory marker in accordance with one embodiment of the present invention.
Figure 4D:
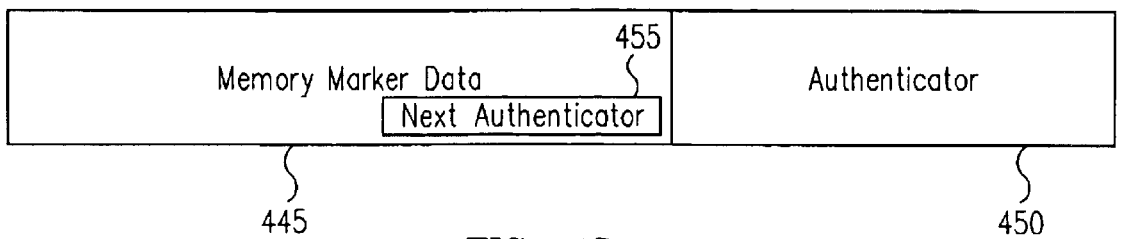
FIG. 4D is a block diagram that illustrates a memory marker having an authenticator field that also serves as a tag field and a reference to a succeeding memory marker in accordance with one embodiment of the present invention.

FIGS. 4A–4B are block diagrams that illustrate exemplary memory marker formats in accordance with embodiments of the present invention. FIG. 4A illustrates a memory marker having separate tag 400 and authenticator 410, as used in the embodiment illustrated in FIG. 3. FIG. 4B illustrates a memory marker having an authenticator field 420 that also serves as a tag field. If the authenticator is fixed, a filler portion of the memory marker data field in each memory marker is modified to ensure the authenticators are the same. FIG. 4C illustrates a memory marker having separate tag 425 and authenticator 435 fields and a reference to a succeeding memory marker 440. The reference may be a direct reference such as a memory line number. The reference may also be indirect, such as the tag of the next memory marker. FIG. 4D illustrates a memory marker having an authenticator field 450 that also serves as a tag field and a reference to a succeeding memory marker 455. The reference may be a direct reference such as a memory line number. The reference may also be indirect, such as the authenticator of the next memory marker.

Turning now to FIG. 5, a block diagram that illustrates an apparatus for portable device memory management using memory markers having an authenticator field that also serves as a tag field in accordance with one embodiment of the present invention is presented. FIG. 5 is similar to FIG. 3, except that the authenticator of FIG. 5 also serves as a tag.

Turning now to FIG. 6, a block diagram that illustrates an apparatus for smart card memory management using memory markers having an authenticator field that also serves as a tag field in accordance with one embodiment of the present invention is presented. FIG. 6 illustrates a Java Card™ technology-enabled smart card. Java Card™ technology-enabled smart cards are discussed in Z. Chen, Java Card™ Technology for Smart Cards (2000). Thus, ROM 606 includes virtual machine implementation code 610, interpreted applet and library code 612 and permanent data 650.

According to embodiments of the present invention, memory markers in EEPROM 608 determine the operational mode of a portable device. According to a specific embodiment, the absence of any memory markers in memory indicates EEPROM 608 is unpartitioned so configuration mode may be executed. Configuration mode allows writing an intermediate set of memory markers to configure the kernel partition 614 of EEPROM 608. The valid presence of the intermediate set of memory markers in EEPROM 608 indicates the kernel partition 614 of EEPROM 608 has been created so kernel mode may be executed. Kernel mode allows writing a final set of memory markers to configure the application partition (616, 618) of EEPROM 608. The valid presence of the final set of memory markers in memory indicates EEPROM 608 has been fully partitioned and so only application mode may be executed. Application mode prohibits partitioning of EEPROM 608. The valid presence of more than one memory marker but less than either the memory markers comprising the intermediate set of memory markers or the final set of memory markers indicates the card 600 may be under attack. If diagnostics are enabled, diagnostic mode is enabled. Diagnostic mode enables, by way of example, commands to display card information such as the card serial number, EEPROM 608 partition information and the like. This is explained in more detail below with respect to FIG. 7.

According to one embodiment of the present invention, a set of memory markers is validly present in EEPROM 608 if the memory markers required for a particular operational mode are present and if each memory marker in the set of memory markers is internally consistent with respect to other memory markers within the same memory marker set. By way of example, a memory marker identified as marking the start of an "Application" partition is validly present in EEPROM 608 if it occurs in EEPROM 608 before a corresponding memory marker identified as marking the end of the "Application" partition.

According to another embodiment of the present invention, a set of memory markers is validly present in EEPROM 608 if the memory markers required for a particular operational mode are present in EEPROM 608 and if each memory marker in the set of the memory markers is externally consistent with respect to memory markers in other memory marker sets. By way of example, a memory marker identified as marking the start of an "Application" partition is invalid if it is located in EEPROM 608 between two memory markers identified as marking the start and end of a "Kernel" partition.

Figure 7:
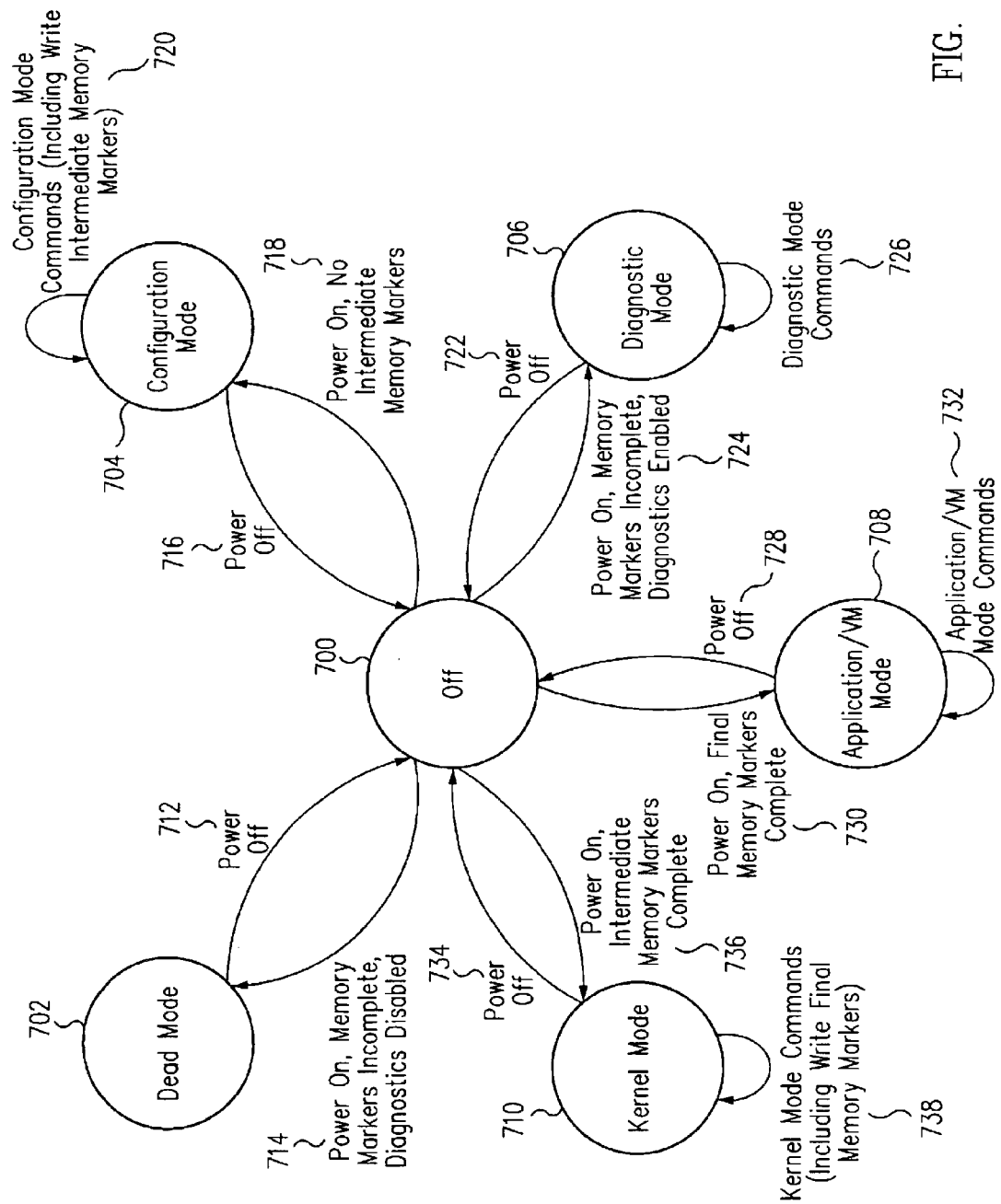
FIG. 7 is a state diagram that illustrates the operational states or modes of a portable device with enhanced memory management in accordance with one embodiment of the present invention.

Turning now to FIG. 7, a state diagram that illustrates the operational states or modes of a portable device with enhanced memory management in accordance with one embodiment of the present invention is presented. Six modes (700, 702, 704, 706, and 708, 710) are represented. The "Off" mode 700 represents when the device is powered off. Kernel mode 710 is entered when the device is powered up with intermediate memory markers validly present (736). Using FIG. 5 as an example, kernel mode is entered when the device is powered up with memory markers 520 and 522 validly present.

Referring again to FIG. 7, kernel mode commands 738 may be executed while in kernel mode 710. Examples of kernel mode commands 738 include commands to write final memory markers and the like. Application/Virtual Machine (VM) mode 708 is entered when the device is powered up with final memory markers validly present in memory. Using FIG. 5 as an example, Application/VM mode 708 is entered when the device is powered up with memory markers 520, 522, 524 and 526 validly present in memory.

Referring again to FIG. 7, application mode commands 732 may be executed while in application mode 708. Configuration mode 704 is entered when the device is powered up with no memory markers validly present in memory. While in configuration mode 704, configuration mode commands 720 may be entered. Examples of configuration mode commands 720 include commands to write intermediate memory markers and the like. Diagnostic mode 706 is entered when the device is powered up with diagnostics enabled and with at least one memory marker but without the intermediate or final memory markers validly present in memory. While in diagnostic mode 706, diagnostic commands 726 may be entered. Examples of diagnostic commands 726 include commands to display card information such as the card serial number, EEPROM partition information and the like. Dead mode 702 is entered when the device is powered up with diagnostics disabled and with at least one memory marker but without the intermediate or final memory markers validly present in memory. Loss of power (712, 716, 722, 728, 734) results in the device returning to the "Off" mode 700.

According to embodiments of the present invention, memory access rights are determined based on factors comprising the operational mode of a program, the address for which access is requested, the requested access type, the origin of the access request or some combination thereof. The access types include a "Read" request and a "Write" request.

According to one embodiment of the present invention, low-level "Read" and "Write" routines stored in a persistent immutable memory such as ROM provide EEPROM access control based on the EEPROM partition information obtained by selectively scanning EEPROM memory lines. When EEPROM is scanned, a memory configuration table that includes the start and end addresses of each partition is created. In operation, the low-level "Read" or "Write" routine receives a request including an address parameter and uses the memory configuration table to determine the zone corresponding to the address. The determination to allow or disallow a particular "Read" or "Write" operation for a particular memory zone is based on the operational mode of the program, the requested access type, the origin of the access request or some combination thereof.

According to another embodiment of the present invention, one or more low-level "Read" or "Write" routines stored in a persistent immutable memory such as ROM is tied to one or more EEPROM memory zones. Each such routine is associated with its own memory configuration table that determines particular access requirements.

Figure 8:
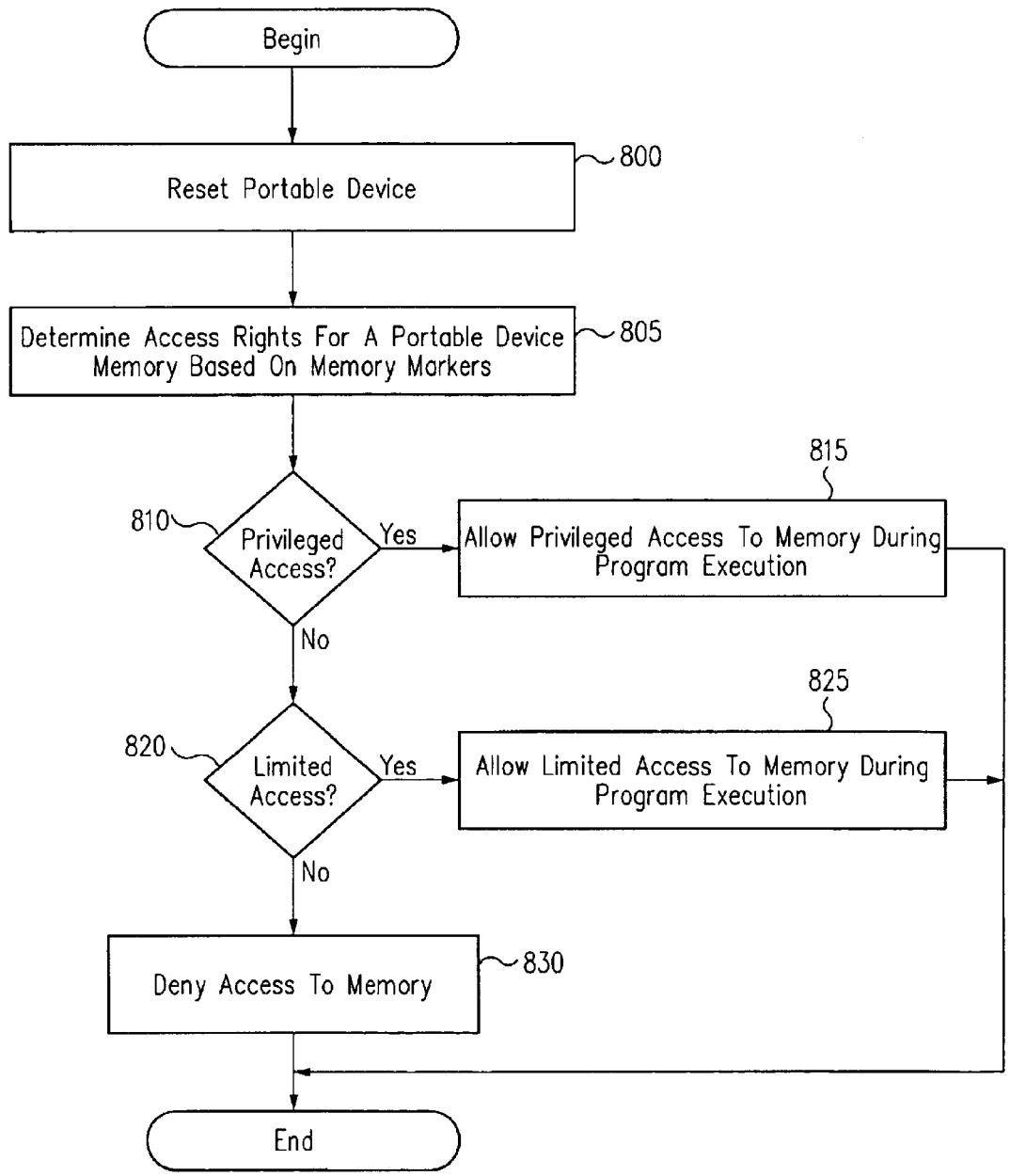
FIG. 8 is a flow diagram that illustrates a method for portable device memory management in accordance with one embodiment of the present invention.
Figure 9:
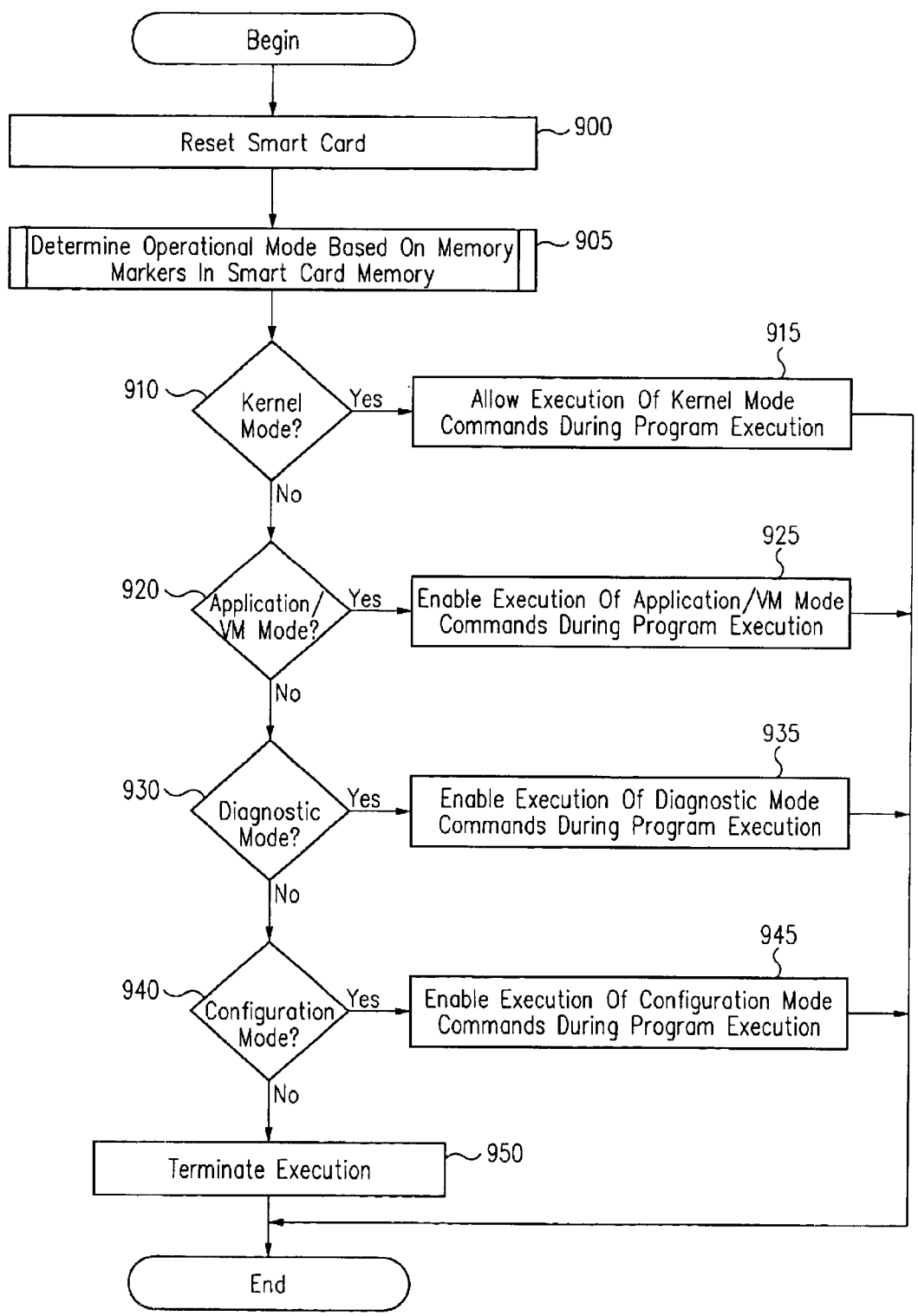
FIG. 9 is a flow diagram that illustrates a method for smart card memory management in accordance with one embodiment of the present invention.

FIGS. 8 and 9 are flow diagrams that illustrate how the valid presence of memory markers in a memory may be used to affect program execution. FIG. 8 illustrates how the valid presence of memory markers in a memory may be used to determine memory access rights, whereas FIG. 9 illustrates how the valid presence of memory markers in a memory may be used to determine the operational mode of a program executing on a portable device.

Turning now to FIG. 8, a flow diagram that illustrates a method for portable device memory management, in accordance with one embodiment of the present invention, is presented. At 800, the portable device is reset. At 805, access rights for the portable device memory are determined based on the valid presence of memory markers in EEPROM. At 810, a determination is made whether privileged access is enabled. If privileged access is enabled, at 815, privileged access to memory during program execution is allowed. If privileged access is disabled, at 820, a determination is made whether limited access is enabled. If limited access is enabled, at 825, limited access to memory during program execution is enabled. If limited access is disabled, at 830, access to memory is denied.

According to embodiments of the present invention, the determinations at reference numerals 810 and 820 are based on whether a particular set of memory markers is validly present in EEPROM. According to one embodiment of the present invention, a set of memory markers is validly present if the memory markers required for a particular operational mode are present and if each memory marker in the set of memory markers is internally consistent with respect to other memory markers within the same memory marker set. By way of example, a memory marker identified as marking the start of an "Application" partition is valid if it occurs in EEPROM before a corresponding memory marker identified as marking the end of the "Application" partition.

According to another embodiment of the present invention, a set of memory markers is validly present if the memory markers required for a particular operational mode are present and if each memory marker in the set of the memory markers is externally consistent with respect to memory markers in other memory marker sets. By way of example, a memory marker identified as marking the start of an "Application" partition is invalid if it is located between two memory markers identified as marking the start and end of a "Kernel" partition.

Turning now to FIG. 9, a flow diagram that illustrates a method for smart card memory management, in accordance with one embodiment of the present invention, is presented. At 900, the smart card is reset. At 905, the operational mode is determined based on memory markers in the smart card memory. At 910, a determination is made whether the operational mode is kernel mode. If the operational mode is kernel mode, at 915, execution of kernel mode commands is allowed during program execution. If the operational mode is not kernel mode, at 920, a determination is made whether the operational mode is application mode. If the operational mode is application mode, at 925, execution of application mode commands during program execution is enabled. If the operational mode is not application mode, at 930, a determination is made whether the operational mode is diagnostic mode. If the operational mode is diagnostic mode, at 935, execution of diagnostic mode commands during program execution is enabled. If the operational mode is not diagnostic mode, at 940, a determination is made whether the operational mode is configuration mode. If the operational mode is configuration mode, at 945, execution of configuration mode commands during program execution is enabled. If the operational mode is not configuration mode, at 950, program execution is terminated.

Figure 10:
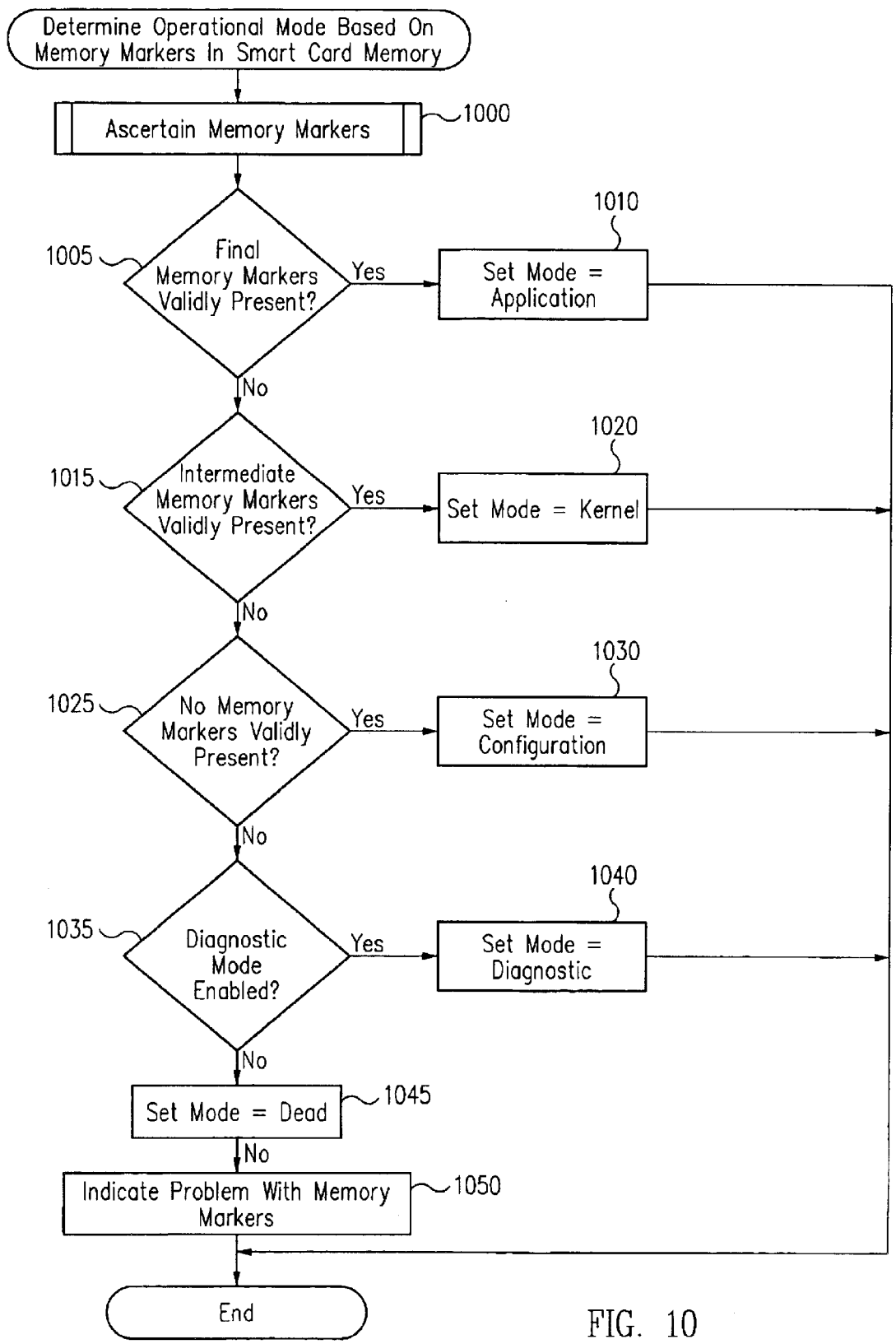
FIG. 10 is a flow diagram that illustrates a method for determining an operational mode based on memory markers in smart card memory in accordance with one embodiment of the present invention.

Turning now to FIG. 10, a flow diagram that illustrates a method for determining an operational mode based on memory markers in smart card memory in accordance with one embodiment of the present invention is presented. FIG. 10 provides more detail for reference numeral 905 of FIG. 9. At 1000, memory markers in EEPROM are ascertained. Ascertaining memory markers in EEPROM comprises populating a memory configuration table that includes at least one partition ID and the start address and end address for the at least one partition ID. At 1005, a determination is made regarding whether final memory markers are validly present in memory. If final memory markers are validly present, at 1010 the current operational mode is set to application mode. If final memory markers are not validly present, at 1015 a determination is made regarding whether intermediate memory markers are validly present in memory. If intermediate memory markers are validly present, at 1020 the current operational mode is set to kernel mode. If intermediate memory markers are not validly present, at 1025 a determination is made regarding whether any memory markers are validly present. If no memory markers are validly present, at 1030 the current operational mode is set to configuration mode. If at least one memory marker is validly present, at 1035 a determination is made regarding whether diagnostic mode is enabled. If diagnostic mode is enabled, at 1040 the current operational mode is set to diagnostic mode. If diagnostic mode is not enabled, at 1045 the current operational mode is set to dead mode and a problem with the memory markers is indicated at 1050.

Figure 11:
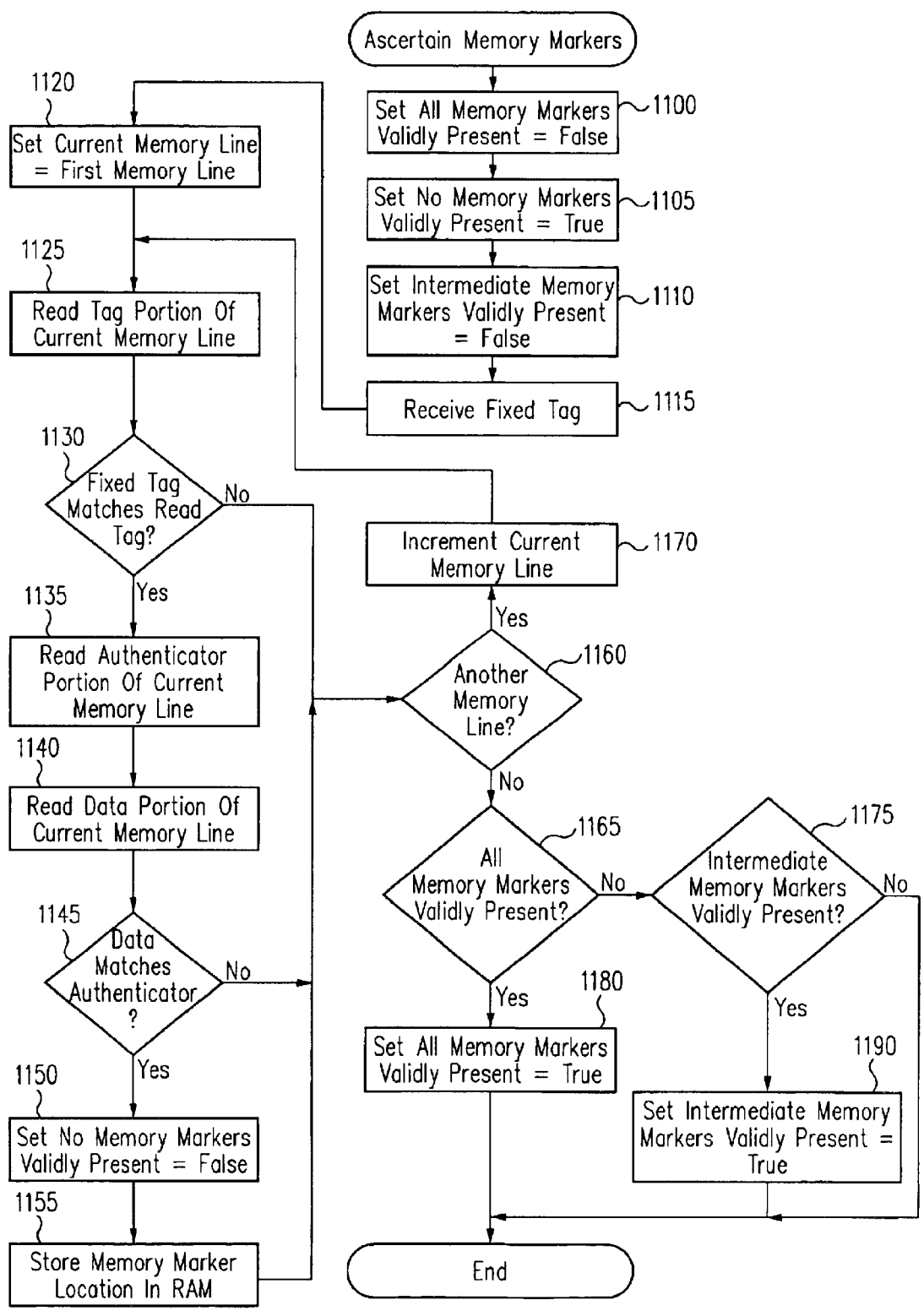
FIG. 11 is a flow diagram that illustrates a method for ascertaining memory markers by selectively scanning memory lines in accordance with one embodiment of the present invention.
Figure 12:
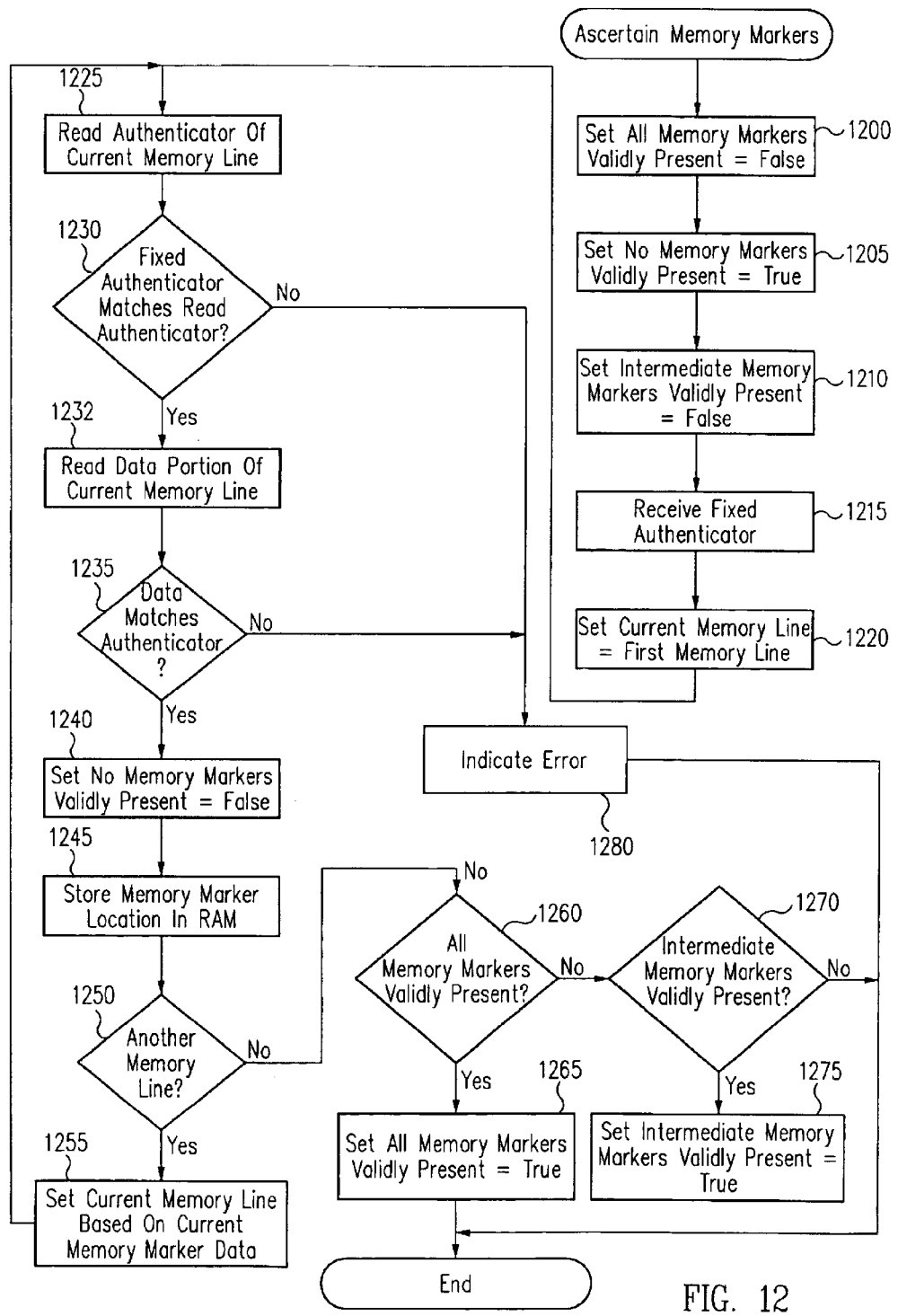
FIG. 12 is a flow diagram that illustrates a method for ascertaining memory markers using memory markers having direct references to succeeding memory markers in accordance with one embodiment of the present invention.
Figure 13:
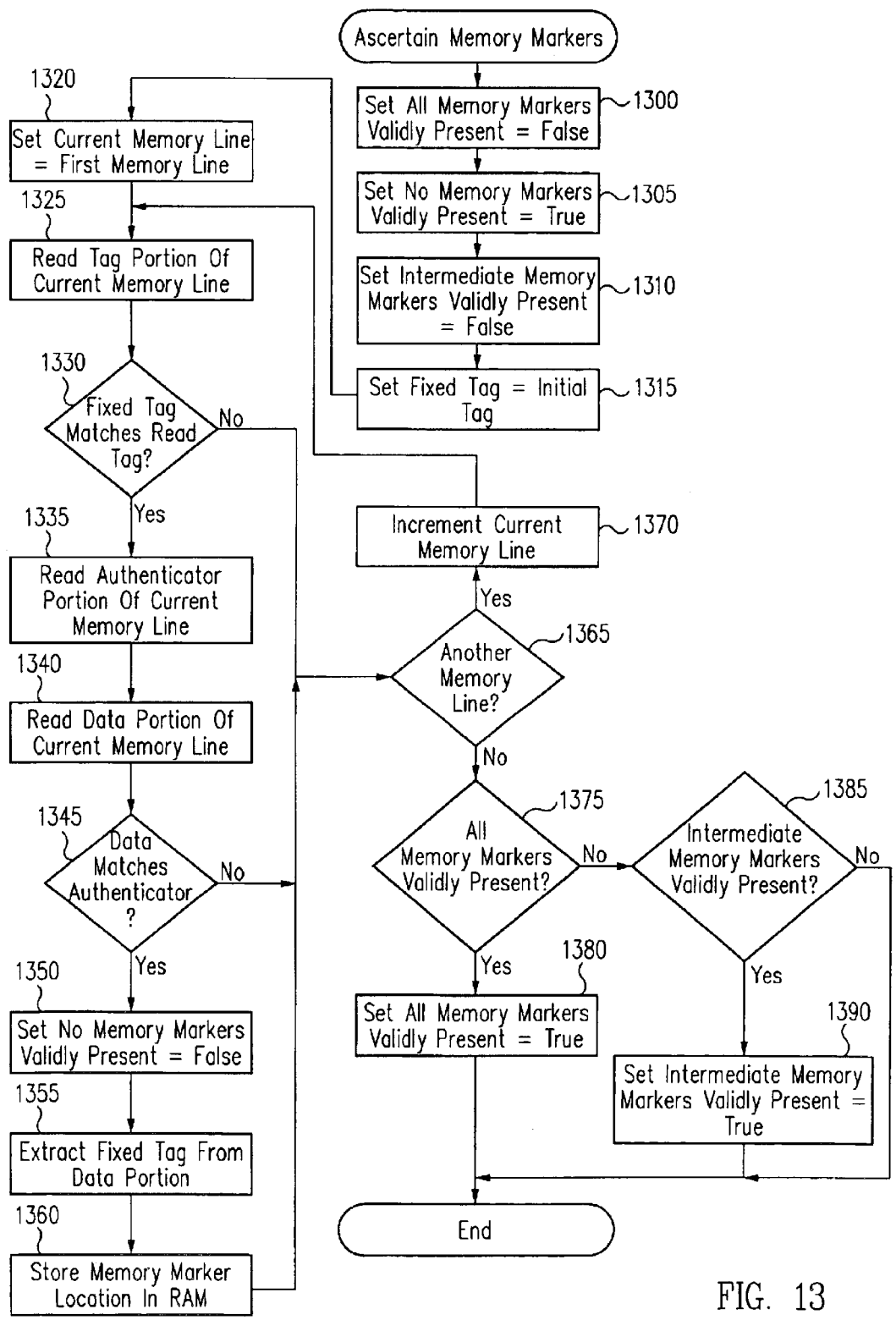
FIG. 13 is a flow diagram that illustrates a method for ascertaining memory markers using memory markers having indirect references to succeeding memory markers in accordance with one embodiment of the present invention.

FIGS. 11–13 are flow diagrams that illustrate methods for ascertaining memory markers in accordance with embodiments of the present invention. FIGS. 11–13 provide more detail for reference numeral 1000 of FIG. 10. FIG. 11 illustrates ascertaining memory markers by selectively scanning parts of memory lines. FIG. 12 illustrates ascertaining memory markers using memory markers having direct references to succeeding memory markers. FIG. 13 illustrates ascertaining memory markers using memory markers having indirect references to succeeding memory markers.

Turning now to FIG. 11, a flow diagram that illustrates a method for ascertaining memory markers by selectively scanning memory lines in accordance with one embodiment of the present invention is presented. At 1100, a flag indicating whether all memory markers are validly present is set to "False". At 1105, a flag indicating whether no memory markers are validly present is set to "True". At 1110, a flag indicating whether intermediate memory markers are validly present is set to "False". At 1115, a fixed tag is received. The fixed tag may be obtained from ROM, or it may be computed based on unique information about the portable device, such as a smart card serial number. At 1120, the current memory line is set initially to the first memory line. At 1125, the tag portion of the current memory line is read. At 1130, a determination is made regarding whether the fixed tag matches the read tag. If the fixed tag matches the read tag, the authenticator and data portions of the current memory line are read at 1135 and 1140, respectively.

Still referring to FIG. 11, at 1145, a determination is made whether the data portion matches the authenticator. If the data portion of the line matches the authenticator, at 1150, the flag indicating whether no memory markers are validly present is set to "False" and at 1155, the memory marker location is stored in a memory configuration table. If the fixed tag does not match the read tag or if the data portion of the memory line does not match the authenticator, at 1160 a determination is made whether there is another memory line to check. If there is another memory line to check, at 1170, the current memory line number is incremented and the process resumes at 1125. If the last line has been read, at 1165, a determination is made whether all the expected memory markers were found. If all the memory markers were found, at 1180, an indication that all memory markers are validly present is made. If all the memory markers were not found, at 1175, a determination whether the intermediate memory markers are validly present is made. If the intermediate memory markers are validly present, an indication to that effect is made at 1190.

It is important to note that the process illustrated in FIG. 11 reads an entire memory line only when the tag portion of the memory line matches a fixed tag. Thus, a microprobe attack would reveal little useful information.

Turning now to FIG. 12, a flow diagram that illustrates a method for determining memory markers using memory markers having direct references to succeeding memory markers in accordance with one embodiment of the present invention is presented. The data portion of each memory marker includes a pointer to the next memory marker. The data portion also includes filler data that is set to ensure a checksum of the data portion matches the fixed authenticator. At 1200, a flag indicating whether all memory markers are validly present is set to "False". At 1205, a flag indicating whether no memory markers are validly present is set to "True". At 1210, a flag indicating whether intermediate memory markers are validly present is set to "False". At 1215, a fixed authenticator is received. At 1220, the current memory line is set initially to the first memory line. At 1225, the authenticator of the current memory line is read.

Still referring to FIG. 12, at 1230 a determination is made whether the fixed authenticator matches the read authenticator. If the fixed authenticator matches the read authenticator, at 1232, the data portion of the current memory line is read and at 1235, a determination is made whether the data portion of the line matches the authenticator. If the data portion of the line matches the authenticator, at 1240, the flag indicating whether no memory markers are validly present is set to "False" and at 1245, the memory marker location is stored in a memory configuration table. If the fixed authenticator does not match the read authenticator or if the data portion of the line does not match the authenticator, an error is indicated at 1280. At 1250, a determination is made whether there is another memory line to check. If there is another memory line to check, at 1255, the current memory line number is set based on the current memory marker data. If the last line has been read, at 1260, a determination is made whether all the expected memory markers were found. If all the memory markers were found, at 1265, an indication that all memory markers are validly present is made. If all the memory markers are not validly present, at 1270, a determination is made whether the intermediate memory markers are validly present. If the intermediate memory markers are validly present, an indication to that effect is made at 1275.

Turning now to FIG. 13, a flow diagram that illustrates a method for ascertaining memory markers using memory markers having indirect references to succeeding memory markers in accordance with one embodiment of the present invention is presented. FIG. 13 is similar to FIG. 11 except that the process illustrated by FIG. 11 uses the same tag throughout, while the process illustrated by FIG. 13 uses the data portion of a memory marker line to determine the tag portion of a succeeding memory marker line (reference numeral 1355 of FIG. 13).

While embodiments of the present invention have been described using memory markers in an EEPROM, the invention may be applied to any memory device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for portable device memory management, the method comprising:

determining an operational mode of a program configured to execute on said portable device based on validating the presence of one or more memory markers in said memory, each of said one or more memory markers comprising a memory line, said memory line having a predetermined length and comprising a data portion and a tag;

allowing one or more commands based on said operational mode; and terminating execution of said program if at least one but less than a predetermined number of memory markers are validly present in said memory.

2. The method of claim 1 wherein said allowing further comprises:

allowing execution of kernel mode commands if said operational mode comprises kernel mode, said kernel mode commands comprising privileged commands; and allowing execution of application mode commands if said operational mode comprises application mode.

3. The method of claim 1 wherein an authenticator comprises a checksum.

4. The method of claim 1 wherein an authenticator comprises a cyclic redundancy check (CRC).

5. The method of claim 1 wherein kernel mode commands comprise one or more commands to store a memory marker in said memory.

6. The method of claim 1 wherein said determining an operational mode further comprises:

ascertaining memory markers in said memory;

indicating said operational mode comprises application mode if all memory markers are validly present in said memory;

indicating said operational mode comprises kernel mode if an intermediate set of memory markers is validly present in said memory;

indicating said operational mode comprises configuration mode if no memory markers are validly present in said memory;

indicating said operational mode comprises diagnostic mode if said at least one memory marker is validly present in said memory and if said diagnostic mode is enabled; and indicating said operational mode comprises dead mode if said at least one memory marker is validly present in said memory and if said diagnostic mode is disabled.

7. The method of claim 6 wherein said tag comprises an authenticator; and said ascertaining memory markers further comprises:
reading the authenticator of each memory line;
reading the data portion of each memory line having an authenticator that matches a fixed authenticator; and
storing the location of said memory line if said data portion matches said authenticator.

8. The method of claim 6 wherein said memory line further comprises an authenticator; and said ascertaining memory markers further comprises:
reading the tag of each memory line;
reading the data portion of each memory line having a tag that matches a fixed tag; and
storing the location of said memory line if said data portion matches the authenticator of said memory line.

9. The method of claim 6 wherein said memory line further comprises an authenticator; and said ascertaining memory markers further comprises:
reading the tag of each memory line;
reading the data portion of each memory line having a tag that matches a fixed tag;
storing the location of said memory line if said data portion matches the authenticator of said memory line; and
changing said fixed tag based on said data portion if said data portion matches said authenticator of said memory line.

10. The method of claim 6 wherein said ascertaining memory markers further comprises:
reading an the authenticator of a memory line;
reading the data portion of said memory line if said memory line includes an authenticator that matches a fixed authenticator; and
storing the location of said memory line if said data portion matches said authenticator.

11. The method of claim 1 wherein said method further comprises determining a location of a second memory line based on said data portion of a first memory line.

12. The method of claim 1 wherein each of said one or more memory markers is associated with at least one memory marker set; and said validating comprises indicating said one or more memory markers is validly present in said memory if all required memory markers for said operational mode are present in said memory.

13. The method of claim 12 wherein said validating further comprises indicating said one or more memory markers is validly present in said memory if all required memory markers for said operational mode are present in said memory and if each of said required memory markers is internally consistent with respect to other required memory markers associated with the same memory marker set.

14. The method of claim 12 wherein said validating further comprises indicating said one or more memory markers is validly present in said memory if all required memory markers for said operational mode are present in said memory and if each of said required memory markers is externally consistent with respect to other required memory markers associated with other memory marker sets.

15. A method for portable device memory management, the method comprising:
determining access rights for a memory of said portable device based on validating the presence of one or more memory markers in said memory, each of said one or more memory markers comprising a memory line, said memory line having a predetermined length and comprising a data portion and a tag; and
allowing access to said memory based on said determining.

16. The method of claim 15 wherein said memory marker further comprises an authenticator, said authenticator being computed over at least part of said data portion.

17. The method of claim 16 wherein said authenticator comprises a checksum.

18. The method of claim 16 wherein said authenticator comprises a cyclic redundancy check (CRC).

19. The method of claim 15 wherein said allowing further comprises:
allowing privileged access to said memory if no memory markers are validly present in said memory;
allowing limited access to said memory if a predetermined number of memory markers are validly present in said memory; and
denying access to said memory if at least one but less than said predetermined number of memory markers is validly present in said memory.

20. The method of claim 19 wherein said privileged access comprises storing a memory marker in said memory.

21. The method of claim 15 wherein each of said one or more memory markers is associated with at least one memory marker set; and said validating comprises indicating said one or more memory markers is validly present in said memory if all required memory markers for an operational mode are present in said memory.

22. The method of claim 21 wherein said validating further comprises indicating said one or more memory markers is validly present in said memory if all required memory markers for said operational mode are present in said memory and if each of said required memory markers is internally consistent with respect to other required memory markers associated with the same memory marker set.

23. The method of claim 21 wherein said validating further comprises indicating said one or more memory markers is validly present in said memory if all required memory markers for said operational mode are present in said memory and if each of said required memory markers is externally consistent with respect to other required memory markers associated with other memory marker sets.

24. A program storage device readable by a machine, embodying a program of instructions executable by the machine to perform a method for memory management, the method comprising:
determining an operational mode of a program configured to execute on said portable device based on validating the presence of one or more memory markers in said memory, each of said one or more memory markers comprising a memory line, said memory line having a predetermined length and comprising a data portion and a tag;

allowing one or more commands based on said operational mode; and terminating execution of said program if at least one but less than a predetermined number of memory markers are validly present in said memory.

25. The program storage device of claim 24 wherein said allowing further comprises:

allowing execution of kernel mode commands if said operational mode comprises kernel mode, said kernel mode commands comprising privileged commands; and allowing execution of application mode commands if said operational mode comprises application mode.

26. The program storage device of claim 24 wherein an authenticator comprises a checksum.

27. The program storage device of claim 24 wherein an authenticator comprises a cyclic redundancy check (CRC).

28. The program storage device of claim 24 wherein a kernel mode commands comprise one or more commands to store a memory marker in said memory.

29. The program storage device of claim 24 wherein said determining an operational mode further comprises:

ascertaining memory markers in said memory;

indicating said operational mode comprises application mode if all memory markers are validly present in said memory;

indicating said operational mode comprises kernel mode if an intermediate set of memory markers is validly present in said memory;

indicating said operational mode comprises configuration mode if no memory markers are validly present in said memory;

indicating said operational mode comprises diagnostic mode if said at least one memory marker is validly present in said memory and if said diagnostic mode is enabled; and indicating said operational mode comprises dead mode if said at least one memory marker is validly present in said memory and if said diagnostic mode is disabled.

30. The program storage device of claim 29 wherein said tag comprises an authenticator; and said ascertaining memory markers further comprises:

reading the authenticator of each memory line;

reading the data portion of each memory line having an authenticator that matches a fixed authenticator; and storing the location of said memory line if said data portion matches said authenticator.

31. The program storage device of claim 29 wherein said memory line further comprises an authenticator; and said ascertaining memory markers further comprises:

reading the tag of each memory line;

reading the data portion of each memory line having a tag that matches a fixed tag; and storing the location of said memory line if said data portion matches the authenticator of said memory line.

32. The program storage device of claim 29 wherein said memory line further comprises an authenticator; and said ascertaining memory markers further comprises:

reading the tag of each memory line;

reading the data portion of each memory line having a tag that matches a fixed tag;

storing the location of said memory line if said data portion matches the authenticator of said memory line; and changing said fixed tag based on said data portion if said data portion matches said authenticator of said memory line.

33. The program storage device of claim 29 wherein said ascertaining memory markers further comprises:

reading an authenticator of a memory line;

reading the data portion of said memory line if said memory line includes an authenticator that matches a fixed authenticator; and storing the location of said memory line if said data portion matches said authenticator.

34. The program storage device of claim 24 wherein said method further comprises determining a location of a second memory line based on said data portion of a first memory line.

35. The program storage device of claim 24 wherein each of said one or more memory markers is associated with at least one memory marker set; and said validating comprises indicating said one or more memory markers is validly present in said memory if all required memory markers for said operational mode are present in said memory.

36. The program storage device of claim 35 wherein said validating further comprises indicating said one or more memory markers is validly present in said memory if all required memory markers for said operational mode are present in said memory and if each of said required memory markers is internally consistent with respect to other required memory markers associated with the same memory marker set.

37. The program storage device of claim 35 wherein said validating further comprises indicating said one or more memory markers is validly present in said memory if all required memory markers for said operational mode are present in said memory and if each of said required memory markers is externally consistent with respect to other required memory markers associated with other memory marker sets.

38. A program storage device readable by a machine, embodying a program of instructions executable by the machine to perform a method for portable device memory management, the method comprising:

determining access rights for a memory of said portable device based on validating the presence of one or more memory markers in said memory, each of said one or more memory markers comprising a memory line, said memory line having a predetermined length and comprising a data portion and a tag; and allowing access to said memory based on said determining.

39. The program,storage device of claim 38 wherein said memory marker further comprises an authenticator, said authenticator being computed over at least part of said data portion.

40. The program storage device of claim 39 wherein said authenticator comprises a checksum.

41. The program storage device of claim 39 wherein said authenticator comprises a cyclic redundancy check (CRC).

42. The program storage device of claim 38 wherein said allowing further comprises:

allowing privileged access to said memory if no memory markers are validly present in said memory;

allowing limited access to said memory if a predetermined number of memory markers are validly present in said memory; and denying access to said memory if at least one but less than said predetermined number of memory markers is validly present in said memory.

43. The program storage device of claim 42 wherein said privileged access comprises storing a memory marker in said memory.

44. The program storage device of claim 38 wherein
each of said one or more memory markers is associated with at least one memory marker set; and
said validating comprises indicating said one or more memory markers is validly present in said memory if all required memory markers for an operational mode are present in said memory.

45. The program storage device of claim 44 wherein said validating further comprises indicating said one or more memory markers is validly present in said memory if all required memory markers for said operational mode are present in said memory and if each of said required memory markers is internally consistent with respect to other required memory markers associated with the same memory marker set.

46. The program storage device of claim 44 wherein said validating further comprises indicating said one or more memory markers is validly present in said memory if all required memory markers for said operational mode are present in said memory and if each of said required memory markers is externally consistent with respect to other required memory markers associated with other memory marker sets.

47. An apparatus for portable device memory management, the apparatus comprising:
means for determining an operational mode of a program configured to execute on said portable device based on validating the presence of one or more memory markers in said memory, each of said one or more memory markers comprising a memory line, said memory line having a predetermined length and comprising a data portion and a tag;
means for allowing one or more commands based on said operational mode; and
means for terminating execution of said program if at least one but less than a predetermined number of memory markers are validly present in said memory.

48. The apparatus of claim 47 wherein said means for allowing further comprises:
means for allowing execution of kernel mode commands if said operational mode comprises kernel mode, said kernel mode commands comprising privileged commands; and
means for allowing execution of application mode commands if said operational mode comprises application mode.

49. The apparatus of claim 47 wherein an authenticator comprises a checksum.

50. The apparatus of claim 47 wherein an authenticator comprises a cyclic redundancy check (CRC).

51. The apparatus of claim 47 wherein kernel mode commands comprise one or more commands to store a memory marker in said memory.

52. The apparatus of claim 47 wherein said means for determining an operational mode further comprises:
means for ascertaining memory markers in said memory;
means for indicating said operational mode comprises application mode if all memory markers are validly present in said memory;
means for indicating said operational mode comprises kernel mode if an intermediate set of memory markers is validly present in said memory;
means for indicating said operational mode comprises configuration mode if no memory markers are validly present in said memory;
means for indicating said operational mode comprises diagnostic mode if said at least one memory marker is validly present in said memory and if said diagnostic mode is enabled; and
means for indicating said operational mode comprises dead mode if said at least one memory marker is validly present in said memory and if said diagnostic mode is disabled.

53. The apparatus of claim 52 wherein
said tag comprises an authenticator; and
said means for ascertaining memory markers further comprises:
means for reading the authenticator of each memory line;
means for reading the data portion of each memory line having an authenticator that matches a fixed authenticator; and
means for storing the location of said memory line if said data portion matches said authenticator.

54. The apparatus of claim 52 wherein
said memory line further comprises an authenticator; and
said means for ascertaining memory markers further comprises:
means for reading the tag of each memory line;
means for reading the data portion of each memory line having a tag that matches a fixed tag; and
means for storing the location of said memory line if said data portion matches the authenticator of said memory line.

55. The apparatus of claim 52 wherein
said memory line further comprises an authenticator; and
said means for ascertaining memory markers further comprises:
means for reading the tag of each memory line;
means for reading the data portion of each memory line having a tag that matches a fixed tag;
means for storing the location of said memory line if said data portion matches the authenticator of said memory line; and
means for changing said fixed tag based on said data portion if said data portion matches said authenticator of said memory line.

56. The apparatus of claim 52 wherein said means for ascertaining memory markers further comprises:
means for reading an authenticator of a memory line;
means for reading the data portion of said memory line if said memory line includes an authenticator that matches a fixed authenticator; and
means for storing the location of said memory line if said data portion matches said authenticator.

57. The apparatus of claim 47 wherein said apparatus further comprises means for determining a location of a second memory line based on said data portion of a first memory line.

58. The apparatus of claim 47 wherein
each of said one or more memory markers is associated with at least one memory marker set; and
said means for determining further comprises means for indicating said one or more memory markers is validly present in said memory if all required memory markers for said operational mode are present in said memory.

59. The apparatus of claim 58 wherein said means for determining further comprises means for indicating said one or more memory markers is validly present in said memory if all required memory markers for said operational mode are present in said memory and if each of said required memory markers is internally consistent with respect to other required memory markers associated with the same memory marker set.

60. The apparatus of claim 58 wherein said means for determining further comprises means for indicating said one or more memory markers is validly present in said memory if all required memory markers for said operational mode are present in said memory and if each of said required memory markers is externally consistent with respect to other required memory markers associated with other memory marker sets.

61. An apparatus for portable device memory management, the apparatus comprising:
  means for determining access rights for a memory of said portable device based on validating the presence of one or more memory markers in said memory, each of said one or more memory markers comprising a memory line, said memory line having a predetermined length and comprising a data portion and a tag; and
  means for allowing access to said memory based on said determining.

62. The apparatus of claim 61 wherein said memory marker further comprises an authenticator, said authenticator being computed over at least part of said data portion.

63. The apparatus of claim 62 wherein said authenticator comprises a checksum.

64. The apparatus of claim 62 wherein said authenticator comprises a cyclic redundancy check (CRC).

65. The apparatus of claim 61 wherein said means for allowing further comprises:
  means for allowing privileged access to said memory if no memory markers are validly present in said memory;
  means for allowing limited access to said memory if a predetermined number of memory markers are validly present in said memory; and
  means for denying access to said memory if at least one but less than said predetermined number of memory markers is validly present in said memory.

66. The apparatus of claim 65 wherein said privileged access comprises storing a memory marker in said memory.

67. The apparatus of claim 61 wherein
  each of said one or more memory markers is associated with at least one memory marker set; and
  said means for determining further comprises means for indicating said one or more memory markers is validly present in said memory if all required memory markers for an operational mode are present in said memory.

68. The apparatus of claim 67 wherein said means for determining further comprises means for indicating said one or more memory marker is validly present in said memory if all required memory markers for said operational mode are present in said memory and if each of said required memory markers is internally consistent with respect to other required memory markers associated with the same memory marker set.

69. The apparatus of claim 67 wherein said means for determining further comprises means for indicating said one or more memory marker is validly present in said memory if all required memory markers for said operational mode are present in said memory and if each of said required memory markers is externally consistent with respect to other required memory markers associated with other memory marker sets.

70. An apparatus for portable device memory management, the apparatus comprising:
  a processor; and
  a memory coupled to said processor, said memory comprising a program configured to determine an operational mode of said program for execution on said processor based on validating the presence of one or more memory markers in said memory, each of said one or more memory markers comprising a memory line, said memory line having a predetermined length and comprising a data portion and a tag, said program further configured to allow access to said memory based on said determining.

71. The apparatus of claim 70 wherein said apparatus comprises a smart card.

72. The apparatus of claim 71 wherein said apparatus comprises a Java Card™ technology-enabled smart card.

73. The apparatus of claim 70 wherein said apparatus is operatively coupled to a hardware fuse such that operation of said apparatus is based at least in part upon the state of said hardware fuse.

74. An apparatus for portable device memory management, the apparatus comprising:
  a processor; and
  a memory coupled to said processor, said memory comprising a program configured to determine access rights for a memory of said portable device based on validating the presence of one or more memory markers in said memory, each of said one or more memory markers comprising a memory line, said memory line having a predetermined length and comprising a data portion and a tag, said program further configured to allow access to said memory based on said determining.

75. The apparatus of claim 74 wherein said apparatus comprises a smart card.

76. The apparatus of claim 74 wherein said apparatus comprises a Java Card™ technology-enabled smart card.

77. The apparatus of claim 76 wherein said apparatus is operatively coupled to a hardware fuse such that operation of said apparatus is based at least in part upon the state of said hardware fuse.

78. A memory for storing data for access by an application program being executed on a data processing system, comprising:
  a data structure stored in said memory, said data structure including information used by said application program to determine an operational mode of said program, said data structure comprising one or more memory markers stored in said memory, each of said one or more memory markers comprising a memory line, said memory line having a predetermined length and comprising:
    a data portion, said data portion comprising information about a partition of said memory associated with said memory marker; and
    a tag, said tag indicating said memory line comprises a memory marker.

79. The memory of claim 78 wherein said memory further comprises an EEPROM (electrical erasable programmable read-only memory).

* * * * *